(12) United States Patent
Waletzko et al.

(10) Patent No.: US 8,047,311 B2
(45) Date of Patent: Nov. 1, 2011

(54) METHOD OF RETAINING STRUCTURAL TRANSMISSION MEMBERS

(75) Inventors: Robert D. Waletzko, Lisbon, ND (US); Jeret L. Hoesel, Lisbon, ND (US); Jason J. Asche, Stirum, ND (US)

(73) Assignee: Clark Equipment Company, West Fargo, ND (US)

( * ) Notice: Subject to any disclaimer, the term of this patent is extended or adjusted under 35 U.S.C. 154(b) by 242 days.

(21) Appl. No.: 12/423,279

(22) Filed: Apr. 14, 2009

(65) Prior Publication Data

US 2009/0256327 A1    Oct. 15, 2009

Related U.S. Application Data

(60) Provisional application No. 61/044,628, filed on Apr. 14, 2008.

(51) Int. Cl.
*B62D 55/00* (2006.01)
(52) U.S. Cl. ............ 180/9.5; 180/9; 180/9.54; 180/311; 180/312; 180/299; 296/204; 296/203.01; 296/190.08
(58) Field of Classification Search ............... 180/9.5, 180/9, 9.54, 311, 312, 299; 296/204, 203.01, 296/190.08
See application file for complete search history.

(56) References Cited

U.S. PATENT DOCUMENTS 2,107,925 A    2/1938  Ash
3,037,571 A *  6/1962  Zelle ............................ 180/9.48
3,872,939 A    3/1975  Eckert
3,970,166 A    7/1976  Sheppard
4,387,779 A *  6/1983  Pisani ............................ 180/9.5

(Continued)

FOREIGN PATENT DOCUMENTS

WO    2007/114644 A1    10/2007

OTHER PUBLICATIONS

Search Report and Written Opinion dated Jun. 23, 2009 for International application No. PCT/US2009/002300, filed Apr. 14, 2009.

(Continued)

*Primary Examiner* — Paul N Dickson
*Assistant Examiner* — Marlon Arce
(74) *Attorney, Agent, or Firm* — John D. Veldhuis-Kroeze; Westman, Champlin & Kelly, P.A.

(57) ABSTRACT

A track driven vehicle comprises a structural member underneath the vehicle. The structural member includes a plurality of structural member apertures for receiving fasteners inserted therethrough. The vehicle also includes a first track carrier and a first mounting strut attached to the first track carrier. The first mounting strut, which attaches the first track carrier to the structural member, includes a plurality of mounting strut apertures which, when aligned with the structural member apertures, receive the fasteners inserted therethrough. One of the first mounting strut and the structural member includes a fixedly attached dowel pin, and the other of the first mounting strut and the structural member includes a pin receiving aperture. When attaching the first track carrier to the structural member using the first mounting strut, the dowel pin extends into the pin receiving aperture to prevent cross-shearing between the structural member and the first mounting strut. This reduces camber between the structural member and the track carrier and allows fewer fasteners to be used to attach the first track carrier to the structural member.

19 Claims, 6 Drawing Sheets

U.S. PATENT DOCUMENTS

| | | | |
|---|---|---|---|
| 4,836,318 A | 6/1989 | Tonsor et al. | |
| 4,893,687 A | 1/1990 | Simmons | |
| 5,435,517 A | 7/1995 | McGuire et al. | |
| 5,752,574 A * | 5/1998 | Oertley | 180/9.5 |
| 6,164,399 A * | 12/2000 | Bays | 180/9.5 |
| 6,293,364 B1 | 9/2001 | Anderson et al. | |
| 7,231,993 B2 * | 6/2007 | Albright et al. | 180/9.5 |
| 7,461,712 B2 * | 12/2008 | Law et al. | 180/41 |
| 7,533,741 B2 * | 5/2009 | Brazier | 180/9.5 |
| 7,721,832 B2 * | 5/2010 | Fischer | 180/9.54 |
| 7,735,594 B2 * | 6/2010 | Hidaka | 180/312 |
| 2002/0113394 A1 * | 8/2002 | Ziech et al. | 280/124.109 |
| 2004/0026153 A1 | 2/2004 | Dershem et al. | |
| 2006/0131083 A1 * | 6/2006 | Matthys et al. | 180/9.5 |
| 2009/0050379 A1 | 2/2009 | Albright et al. | |

OTHER PUBLICATIONS

Communication from the European Patent Office dated Jan. 4, 2011 for European application No. 09733256.3, filed Apr. 14, 2009.

* cited by examiner

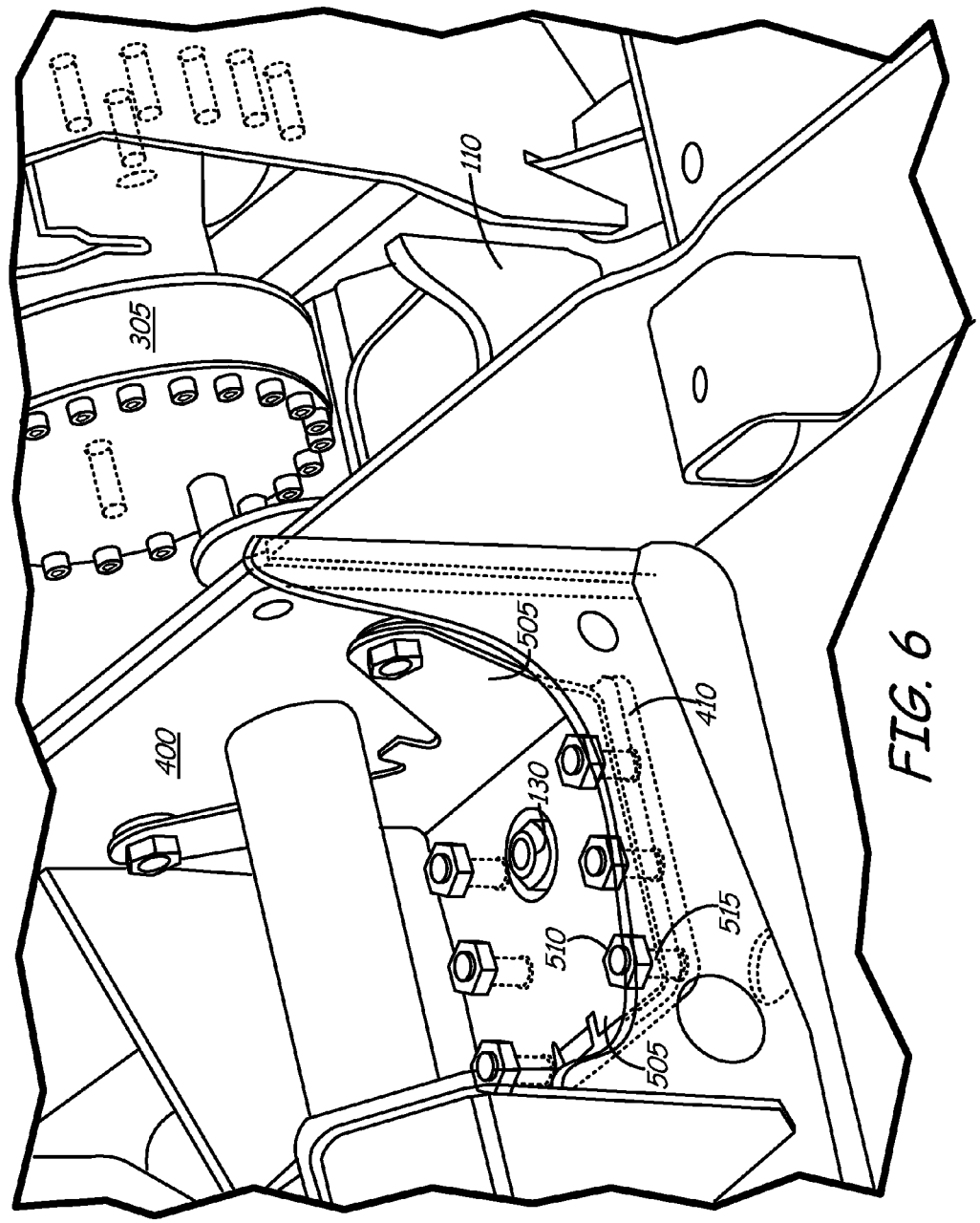

METHOD OF RETAINING STRUCTURAL TRANSMISSION MEMBERS

BACKGROUND

Loaders and other track driven vehicles typically have a track loader undercarriage (a track carrier or track frame) which is physically coupled to a structural member such as the transmission tub of the vehicle. The track undercarriage is typically mounted to the transmission using a number of fasteners. If these fasteners are not torqued sufficiently, or if the joint slips, they allow for the track carriage to slip out, creating a camber problem with the track carriage. As the weight of the track driven vehicles increases, the number of bolts required to hold the track carriage often increases, driving up costs and assembly time.

The discussion above is merely provided for general background information and is not intended to be used as an aid in determining the scope of the claimed subject matter.

SUMMARY

Disclosed embodiments incorporate a dowel pin attachment mechanism, along with bolts or other fasteners, to attach track carriages of a track driven vehicle to a surface of a transmission or other structural members, allowing the number of fasteners that are required to keep the track carriage from slipping to be reduced, and to create a tighter fit between the track carriage and the transmission tub or other surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6 is another perspective view of further portions of the transmission coupled to the track carrier using the mounting strut of FIG. 2.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Figure 1:
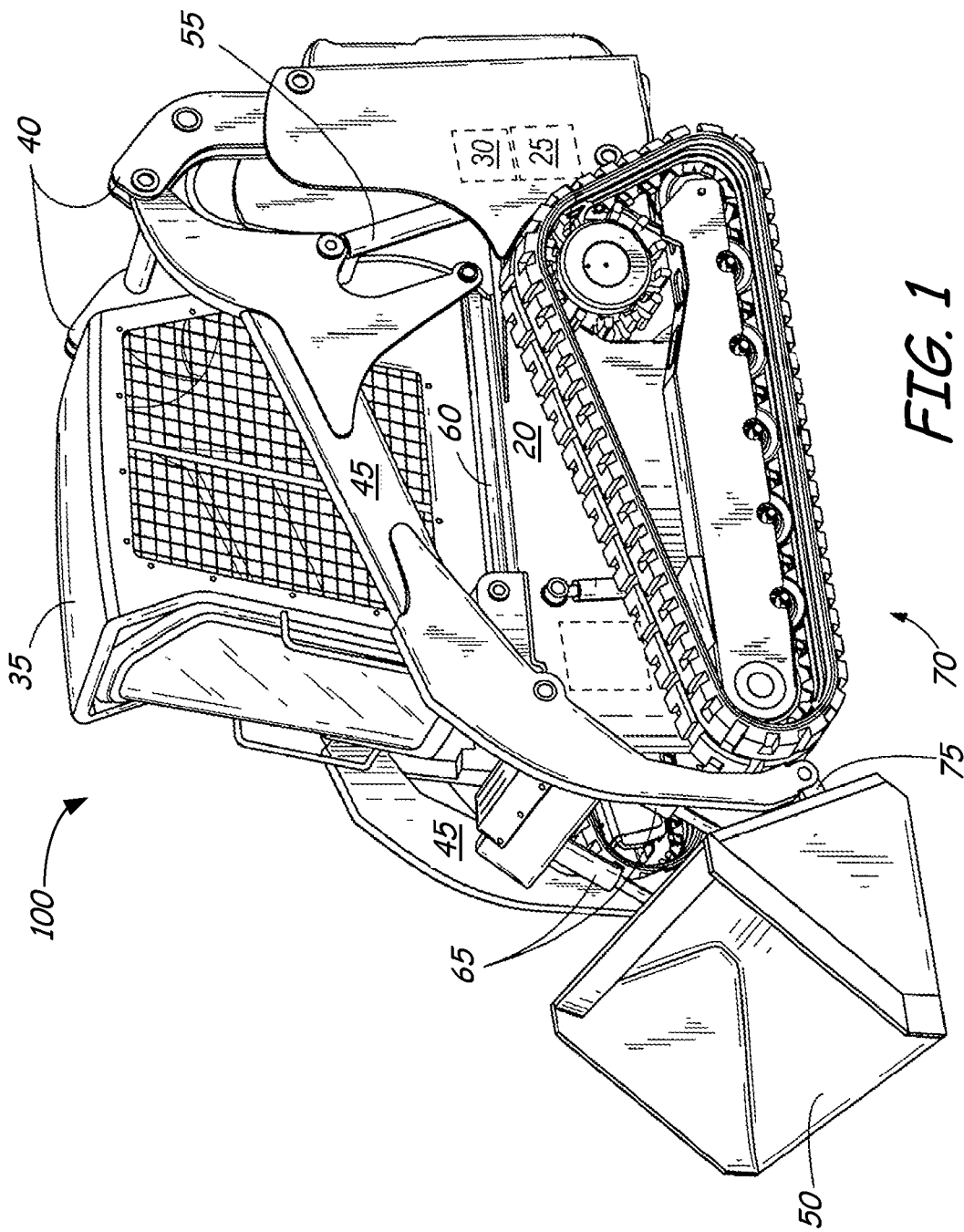
FIG. 1 is a perspective view of an example track driven vehicle which utilizes disclosed embodiments.

FIG. 1 illustrates a track loader vehicle 100 according to one embodiment of the invention. Although the invention is illustrated as embodied in a track loader 100, it may also be embodied in other track vehicles. The track loader 100 includes a body frame 20, a hydraulic system 25, an engine 30, a cab 35, a pair of support arms or masts 40, a pair of lift arms 45, a bucket 50, a pair of lift actuators 55, a pair of support links 60, a pair of attachment actuators 65, and a pair of track carriages or assemblies 70 (one on each of the opposite sides of the track loader 100).

The engine 30 drives one or more hydraulic pumps within the hydraulic system 25, and the pumps provide a flow of hydraulic fluid to the actuators 55, 65 and hydraulic drive systems to operate the track assemblies 70 (discussed in more detail below). The operator controls the hydraulic drive system 25, and therefore operates the track loader 100, with controls in the cab 35. In some embodiments, the controls move spool valves (not shown) to direct the hydraulic fluid to the lift actuators 55 and the attachment actuators 65. The support arms 40 are pivotably mounted to the body frame 20, the lift arms 45 are pivotably mounted to the support arms 40, and an attachment interface 75 is pivotably mounted to the lift arms 45. The lift actuators 55 are interconnected between the lift arms 45 and the body frame 20 and extend and retract in response to the operator's control of the hydraulic system 25 to cause the lift arms 45 to pivot in raising and lowering directions with respect to the support arms 40 and body frame 20. The support links 60 provide additional support and stability to the lift arms 45.

The attachment actuators 65 are interconnected between the lift arms 45 and the attachment interface 75, and extend and retract in response to the operator's control of the hydraulic system 25 to pivot the bucket 50 in curling and dumping directions with respect to the lift arms 45. Although the illustrated attachment is a bucket 50, the track loader may in other embodiments include other attachments, including without limitation, augers, jack hammers, trenchers, grapples, rotary sweepers, stump grinders, saws, concrete mixers, pumps, chippers, snow throwers, rotary cutters, and backhoes. With other attachments, the attachment actuators 65 may be used to raise, lower, tilt, or pivot the attachments for their intended purposes.

In some track driven vehicles such as loaders, track carriers of the track assemblies are typically welded structures having a strut mount (or undercarriage strut) which is designed to be bolted to a surface of the transmission. Mounting plates of the strut mount have apertures for receiving a large number of bolt fasteners, as do mounting plates (sometimes referred to as "doubler plates") which are welded or otherwise affixed to the transmission. With these apertures aligned, the bolts are inserted through the apertures of both mounting plates and secured with nuts to physically couple the track carrier to the transmission. As mentioned, as the weight of track driven vehicles increases, the number of bolts used to hold the track carriage often increases. This in turn increases assembly time and costs.

As bolts used to couple the track carrier to the transmission or other surface loosen, the tolerances of the bolt apertures allows for lateral movement between the track carrier and the transmission, creating the camber problem mentioned above. The bolts in turn are exposed to shearing forces, which can break the bolts off. The shearing of bolts can potentially allow the track loader undercarriage to slide off.

Disclosed embodiments implement an improved method or mechanism for physically coupling the track carrier to a structural member such as the transmission tub of the vehicle 100. Using disclosed embodiments, a dowel pin design allows the number of fasteners that are required to keep the track carriage from slipping to be reduced. Disclosed embodiments also create a tighter fit between the track carriage and the transmission tub (or other structural member). The connection between the two structures utilizes a machined pin welded to one of the structures (e.g., to the track carrier), an aperture in the outer plate of the transmission, and a closer fitting hole in a doubler plate welded to the transmission. Utilizing less bolts or other fasteners potentially reduces costs and assembly time, while use of the dowel pin allows for a tighter connection between the track carrier and the transmission or other surface.

The figures of the present application provide example embodiments of the mechanism for physically coupling a track carrier to a structural member of a vehicle such as a transmission tub. In exemplary embodiments, these figures illustrate components of a track driven loader, though the components can correspond to other construction vehicles or other types of vehicles as well. Although only portions are shown, the vehicle in these drawings is represented generally by reference number 100.

Figure 2:
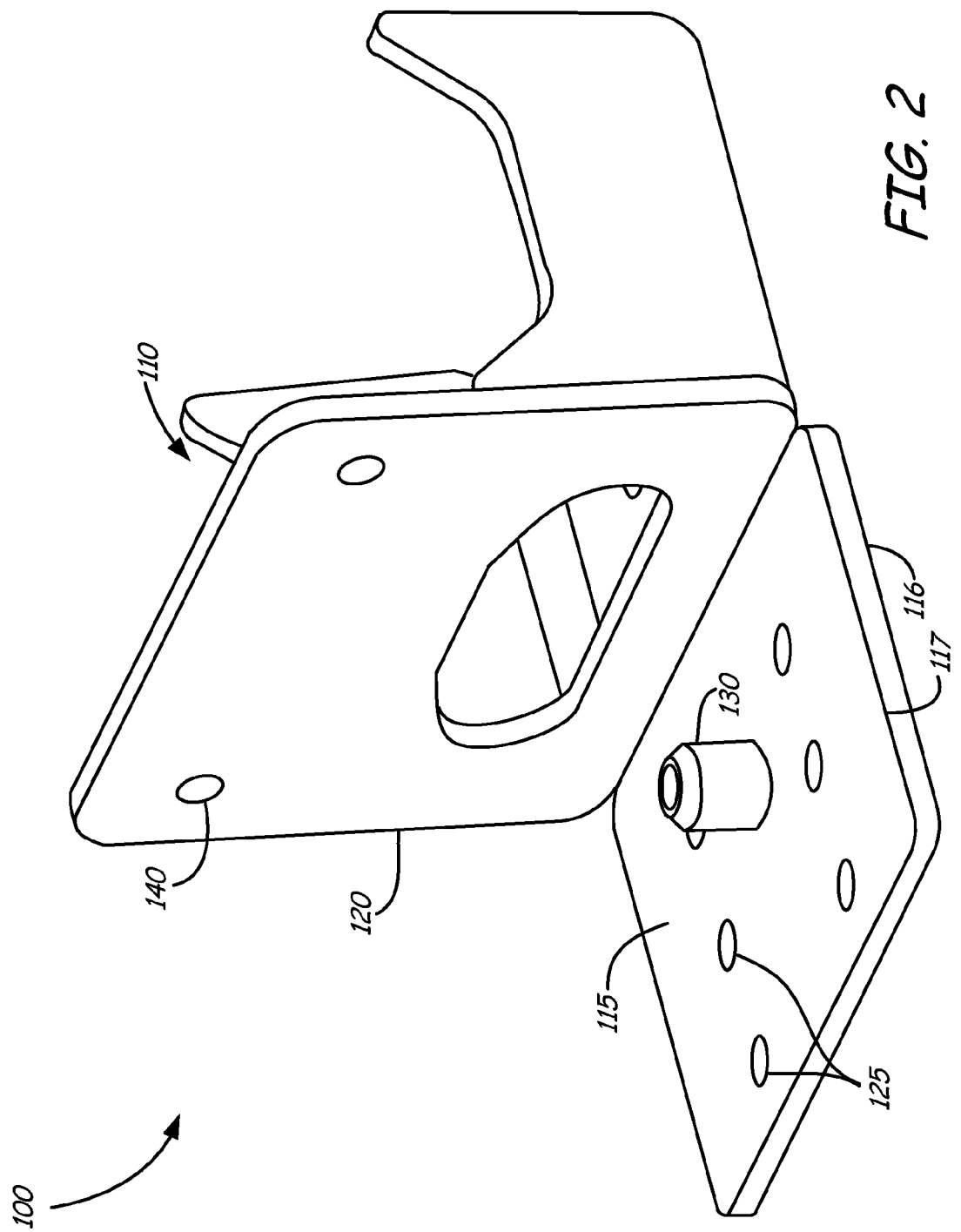
FIG. 2 is a perspective view of a mounting strut, of a track carrier of a track driven vehicle, including a dowel pin.

Referring first to FIG. 2, shown is a mounting strut 110 for a track carrier in accordance with some disclosed embodiments. Mounting strut 110 includes a horizontal mounting plate 115 and a vertical mounting plate 120. Reference to mounting plates 110 and 115 as "horizontal" and "vertical" does not imply that these mounting plates must, in all embodiments, be mounted horizontal and vertical relative to the ground. These plates are typically, but not necessarily in all embodiments, oriented perpendicular or orthogonally to each other. Each of plates 115 and 120 have bolt holes or apertures 125 or 140 extending therethrough for the purpose of receiving bolt type fasteners for mounting a track carrier to a transmission surface or to other structural members of the vehicle. The bolt holes can be of differing diameters if desired, or can all be of the same diameter. Also, differing numbers of apertures in each of plates 115 and 120 can be utilized.

Figure 3:
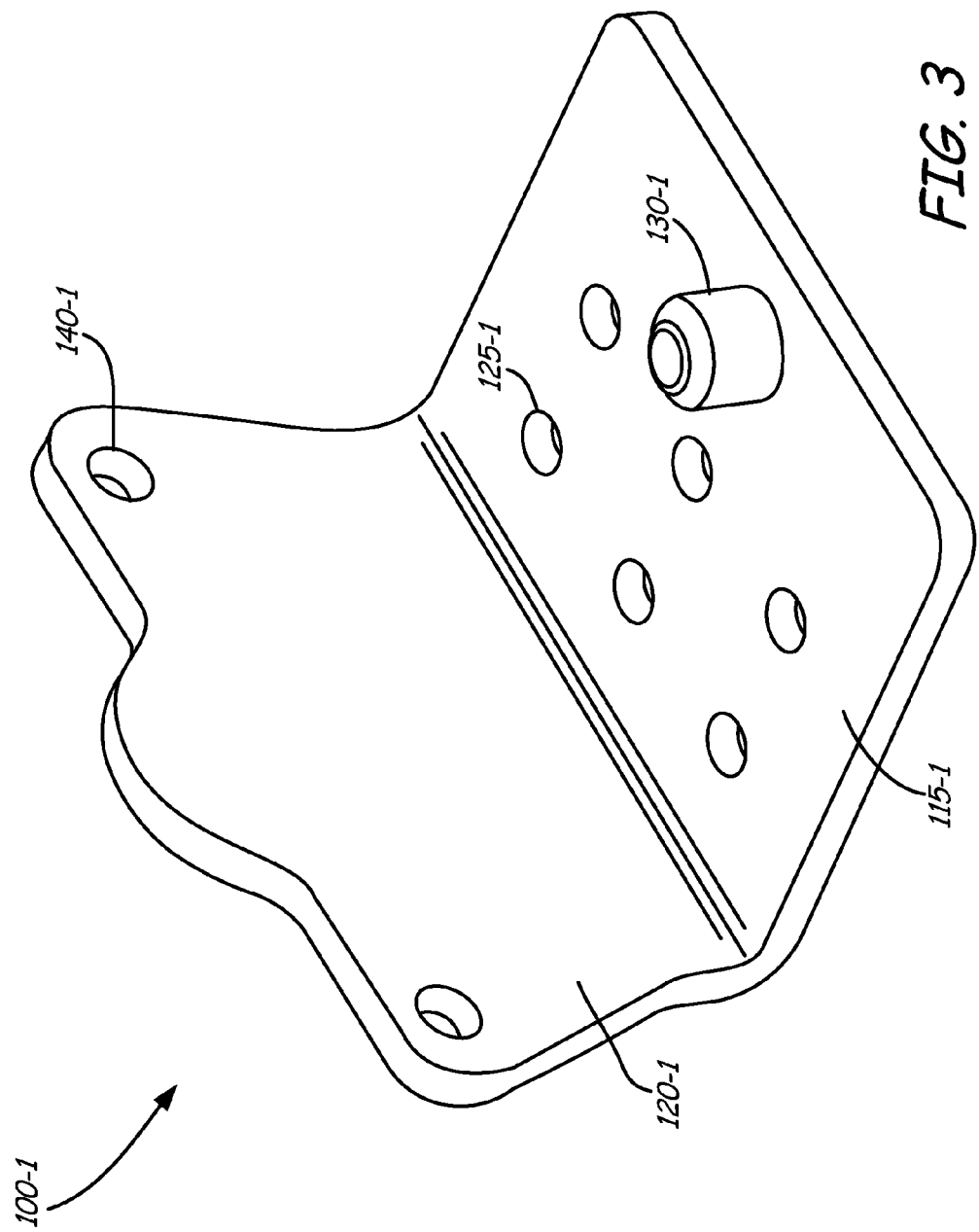
FIG. 3 is perspective view of an alternate embodiment of the mounting strut of a track carrier for a track driven vehicle.

Positioned on the horizontal mounting plate 115 is a dowel pin 130. Dowel pin 130 is typically a machined pin made of steel or other metals, which is welded to a bottom 116 or a top 117 of mounting plate 115. While dowel pin 130 is positioned between the bolt apertures 125 on horizontal mounting plate 115, this need not be the case in all embodiments. For example, referring for the moment to FIG. 3, shown is an alternate embodiment of a mounting strut 110-1 in which pin 130-1 is positioned adjacent or next to, but not between, apertures 125-1 formed in horizontal mounting plate 115-1.

Figure 4:
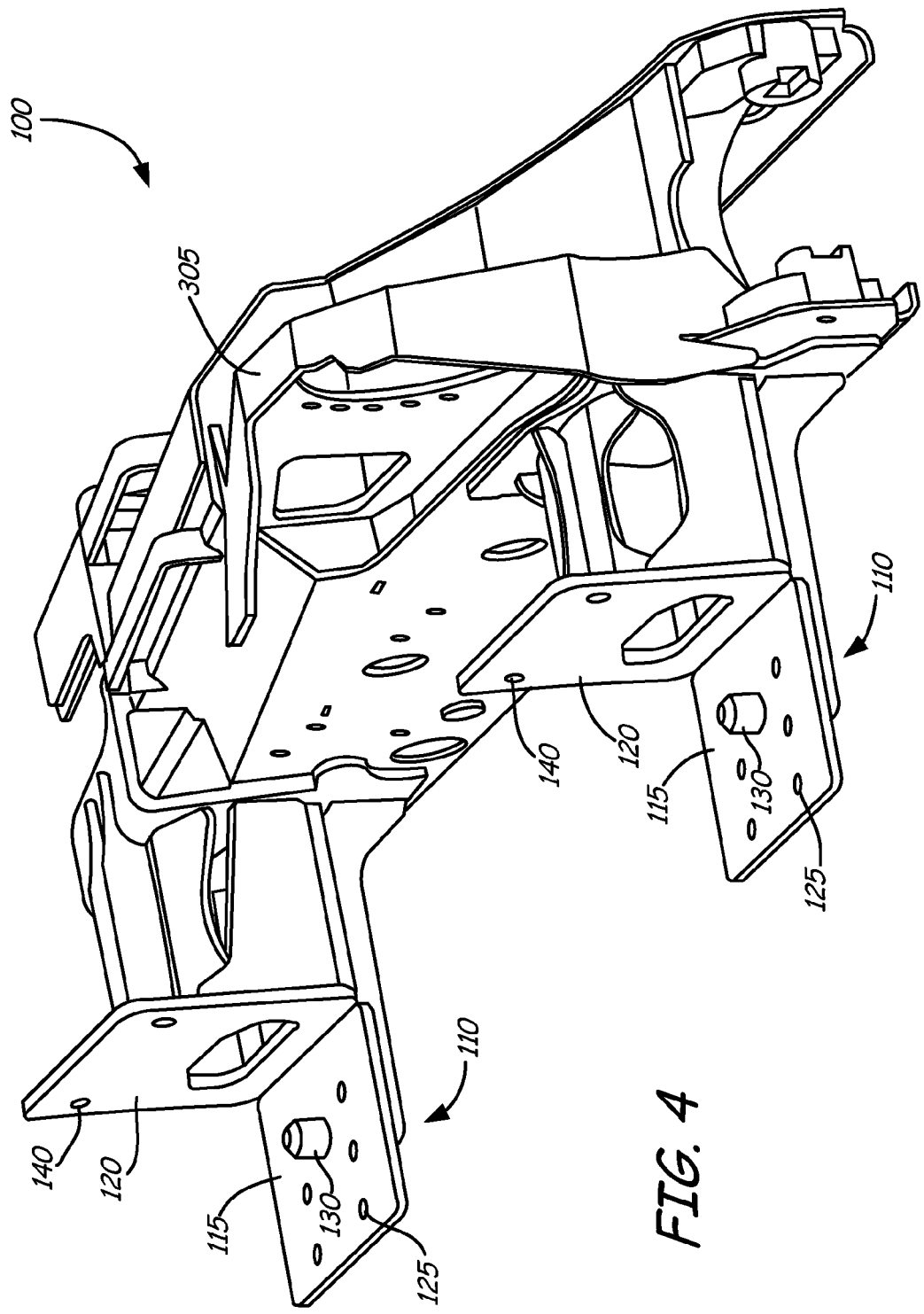
FIG. 4 is perspective view of a track carrier which includes two mounting struts as shown in FIG. 2.

Referring now to FIG. 4, shown is track carrier 305 of a track assembly 70 which includes two mounting struts 110 of the type described above, for securely attaching the track carrier to a transmission tub or to other surfaces in a manner which reduces the number of bolts or other fasteners required, and in a manner which reduces any camber problems of lateral movement between the strut mounting plates (and thus the track carrier itself) and the transmission or other surface.

Figure 5:
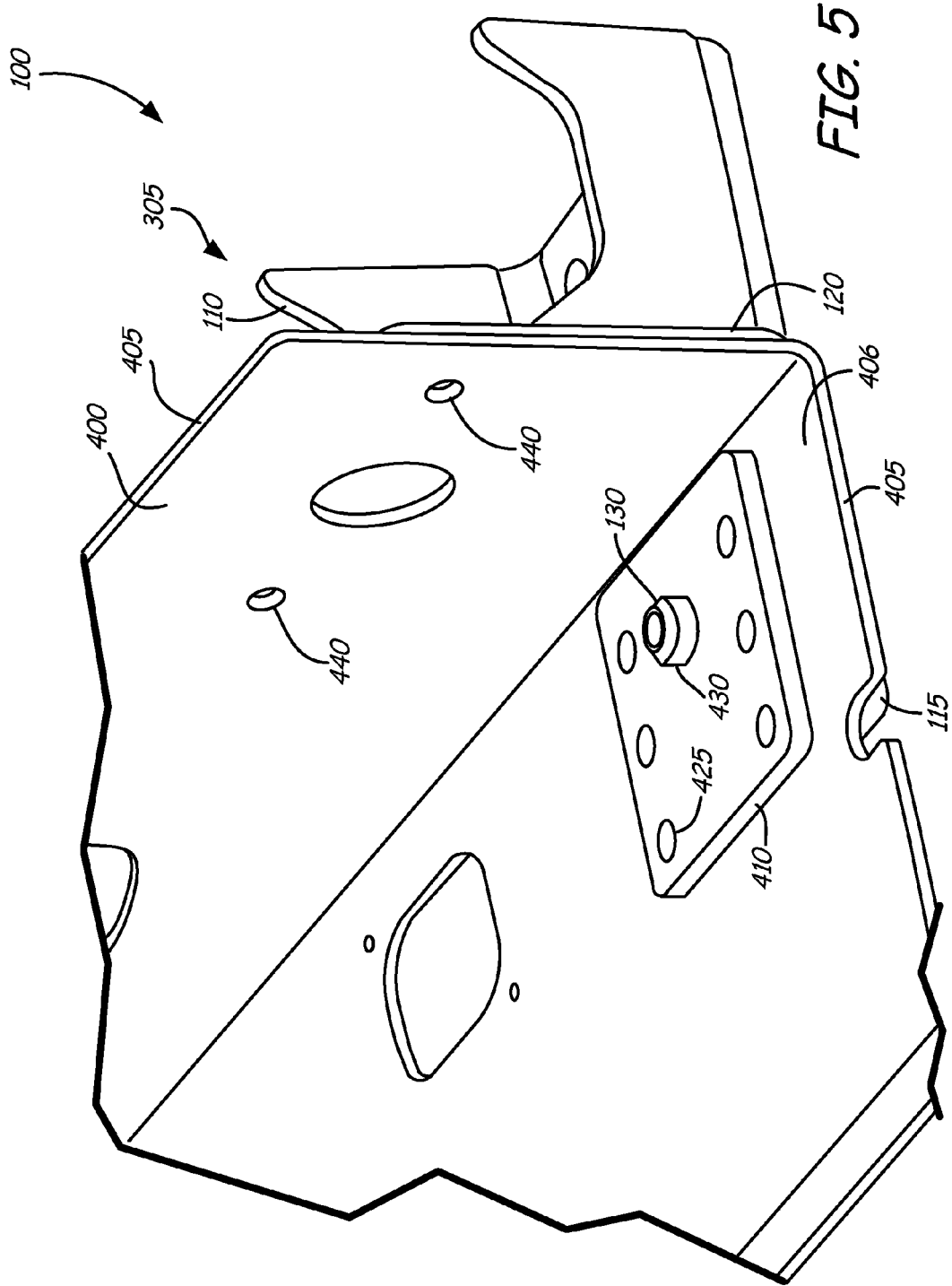
FIG. 5 is a perspective view of a portion of a transmission coupled to the track carrier using the mounting strut of FIG. 2.

Referring now to FIG. 5, shown is one of the mounting strut 110 portions of track carrier 305 in a state of partial assembly to an outer plate or portion 405 of transmission 400. Other portions of track carrier 305 and transmission 400 are omitted to simplify the illustration. As shown in FIG. 5, a doubler or mounting plate 410 is welded to surface 406 of transmission 400. Doubler plate 410 includes a plurality of apertures 425 aligned with apertures 125 in horizontal mounting plate 115. Transmission 400 also includes apertures 440 aligned with apertures 140 in vertical mounting plate 120.

A pin receiving aperture 430 is also formed in doubler plate 410 for receiving dowel pin 130. Another pin receiving aperture would be formed in portion 405 of transmission 400 beneath aperture 430, but would generally be a looser fitting (relative to the diameter of pin 130) aperture than is aperture 430.

Referring now to FIG. 6, shown is another view of portions of track carrier 305 and transmission 400 and the disclosed coupling mechanism. As shown in FIG. 6, a nut bar plate 505 can be included for positioning and holding nuts 510 which thread attach to bolts 515 inserted through apertures 125/425, 140/440 (and the apertures in outer plate 405 of transmission 400).

Using the disclosed attachment mechanism, which combines a number of fasteners (e.g., nut/bolt combinations) with a dowel pin on the strut mounting plate, a better coupling between the track carrier and the transmission can be achieved. The dowel pin creates cross-sectional area of the attachment mechanism to prevent cross-shearing, thus allowing the use of fewer bolts. For example, where a dozen bolts would traditionally be used, the coupling can be achieved with six or less bolts when the dowel pin is also utilized. The aperture-to-dowel pin tolerances can be made tighter than a traditional bolt hole-to-bolt tolerance because the weld fixturing (mechanism and method of locating the pin apertures) allows for a closer fit than a nut and bolt fastener connection. With these tighter tolerances provided by the dowel pin and its corresponding apertures in the transmission and doubler plate, less lateral movement is possible. This in turn reduces shear forces on the bolts and reduces camber between the transmission and the track carrier.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, in various embodiments, the track carrier is shown coupled to an outer plate or surface of a transmission. However, in other embodiments, the track carrier can be attached to other surfaces using the dowel pin attachment mechanism. Also, while example numbers of bolts, or position of the bolts relative to the dowel pin are shown, disclosed embodiments are not limited to these specific example configurations. Other examples of modifications of the disclosed concepts are also possible, without departing from the scope of the disclosed concepts.

What is claimed is:

1. A track driven vehicle, comprising:
   a structural member underneath the vehicle, the structural member including a plurality of structural member apertures for receiving fasteners inserted therethrough;
   a first track carrier;
   a mounting plate including a plurality of apertures for receiving fasteners inserted therethrough and positioned adjacent a surface of the structural member so that the apertures on the mounting plate are aligned with the structural member apertures;
   a first mounting strut attached to the first track carrier and configured to attach the first track carrier to the structural member, the first mounting strut including a plurality of mounting strut apertures which, when aligned with the structural member apertures, receive the fasteners inserted therethrough;

wherein one of the first mounting strut and the mounting plate includes a fixedly attached dowel pin and the other of the first mounting strut and the mounting plate includes a pin receiving aperture, and when attaching the first track carrier to the structural member using the first mounting strut, the dowel pin extends generally vertically into the pin receiving apertures to prevent horizontal cross-shearing between the structural member and the first mounting strut, thereby reducing camber between the structural member and the track carrier and allowing fewer fasteners to be used to attach the first track carrier to the structural member.

2. The track driven vehicle of claim 1, wherein the structural member includes a transmission tub of the vehicle.

3. The track driven vehicle of claim 1, wherein the first mounting strut includes the dowel pin and the mounting plate includes the pin receiving aperture.

4. The track driven vehicle of claim 3, wherein the first mounting strut comprises first and second strut mounting plates, each of the first and second strut mounting plates including the mounting strut apertures, but only one of the first and second mounting plates of the first mounting strut having the fixedly attached dowel pin.

5. The track driven vehicle of claim 1, wherein the fasteners include bolt fasteners.

6. The track driven vehicle of claim 5, wherein the dowel pin is welded to the one of the first mounting strut and the structural member.

7. The track driven vehicle of claim 6, wherein the dowel pin is positioned between the plurality of structural member apertures or between the plurality of mounting strut apertures.

8. The track driven vehicle of claim 6, wherein the dowel pin is positioned adjacent, but not between, the plurality of structural member apertures or between the plurality of mounting strut apertures.

9. The track driven vehicle of claim 1, and further comprising a second mounting strut attached to the first track carrier and configured to attach the first track carrier to the structural member, the second mounting strut being configured the same as the first mounting strut.

10. The track driven vehicle of claim 1, wherein the pin receiving aperture in the structural member has a larger diameter than the pin receiving aperture in the other of the first mounting strut and the mounting plate.

11. The track driven vehicle of claim 4, wherein the first and second strut mounting plates are perpendicular to each other.

12. The track driven vehicle of claim 1 wherein each of the fasteners includes a nut and bolt and further comprising a nut bar plate for positioning at least a portion of the nuts.

13. A track driven vehicle, comprising:
a structural member underneath the vehicle, the structural member including a plurality of structural member apertures for receiving fasteners inserted therethrough;
a first track carrier;
a first mounting strut having first and second strut mounting plates attached to the first track carrier and configured to attach the first track carrier to the structural member, the each of the first and second strut mounting plates including a plurality of mounting strut apertures which, when aligned with the structural member apertures, receive the fasteners inserted therethrough;
wherein the first mounting strut includes a dowel pin fixedly attached to one the first and second strut mounting plates and the structural member includes a pin receiving aperture, and when attaching the first track carrier to the structural member using the first mounting strut, the dowel pin extends into the pin receiving aperture to prevent cross-shearing between the structural member and the first mounting strut, thereby reducing camber between the structural member and the track carrier and allowing fewer fasteners to be used to attach the first track carrier to the structural member.

14. The track driven vehicle of claim 13, wherein the structural member includes a structural member mounting plate.

15. The track driven vehicle of claim 13, wherein the structural member includes a structural member mounting plate including a plurality of structural member mounting plate apertures aligned with the structural member apertures and the mounting strut apertures to receive the fasteners inserted therethrough.

16. The track driven vehicle of claim 13, wherein the structural member includes a transmission tub of the vehicle.

17. The track driven vehicle of claim 13, and further comprising a second mounting strut attached to the first track carrier and configured to attach the first track carrier to the structural member.

18. The track driven vehicle of claim 13, wherein the first and second strut mounting plates are perpendicular to each other.

19. The track driven vehicle of claim 13, wherein each of the fasteners includes a nut and bolt and further comprising a nut bar plate for positioning at least a portion of the nuts.

* * * * *